(12) United States Patent
Kim

(10) Patent No.: US 7,746,960 B2
(45) Date of Patent: Jun. 29, 2010

(54) APPARATUS AND METHOD FOR COMPENSATING FOR I/Q MISMATCH IN TDD SYSTEM

(75) Inventor: Byung-Wook Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 900 days.

(21) Appl. No.: 11/511,957

(22) Filed: Aug. 29, 2006

(65) Prior Publication Data

US 2007/0047672 A1    Mar. 1, 2007

(30) Foreign Application Priority Data

Aug. 30, 2005   (KR) .................... 10-2005-0079963

(51) Int. Cl.
*H03D 3/22* (2006.01)
*H03K 9/00* (2006.01)

(52) U.S. Cl. ..................... 375/329; 375/316
(58) Field of Classification Search ................ 375/329, 375/322, 316
See application file for complete search history.

(56) References Cited

U.S. PATENT DOCUMENTS

| 6,081,161 A * | 6/2000 | Dacus et al. ................ 330/297 |
| 2002/0097812 A1* | 7/2002 | Wiss ........................... 375/316 |
| 2003/0231726 A1* | 12/2003 | Schuchert et al. ........... 375/350 |
| 2005/0047384 A1* | 3/2005 | Wax et al. ................... 370/338 |
| 2005/0111522 A1* | 5/2005 | Sung et al. .................. 375/145 |
| 2006/0014500 A1* | 1/2006 | Marsili ..................... 455/115.1 |
| 2006/0133548 A1* | 6/2006 | Oh et al. ..................... 375/346 |

FOREIGN PATENT DOCUMENTS

| KR | 10-2001-0076711 | 8/2001 |
| KR | 1020030064085 | 7/2003 |
| KR | 10-2003-0088813 | 11/2003 |
| KR | 1020070024756 | 3/2007 |
| WO | WO 03/071758 | 8/2003 |

OTHER PUBLICATIONS

Green et al., Quadrature Receiver Mismatch Calibration, IEEE Transactions on Signal Processing, vol. 47, No. 11, Nov. 1999, pp. 3130-3133.
Churchill, et al., The Correction of I and Q Errors in a Coherent Processor, IEEE Transactions on Aerospace and Electronic Systems, vol. AES-17, No. 1, pp. 131-137, Jan. 1981.

* cited by examiner

*Primary Examiner*—David C Payne
*Assistant Examiner*—Brian J Stevens
(74) *Attorney, Agent, or Firm*—The Farrell Law Firm, LLP

(57) ABSTRACT

Provided are an apparatus and a method for compensating for an I/Q mismatch using a transmission signal in a wireless communication system. The apparatus includes a coupler, an FFT operator, and an I/Q mismatch estimator. The coupler couples the transmission signal and provides the coupled signal to a reception path, and the FFT operator performs FFT on the coupled transmission signal. The I/Q mismatch estimator estimates I/Q mismatch using a preamble of the FFT-performed transmission signal. The apparatus can compensate for I/Q mismatch in real-time. Since the FFT provided to a reception signal detection unit of a TDD OFDM receiver is used without the need for a separate algorithm for Fourier transform required during an I/Q mismatch estimation process of the conventional art, resources can be saved.

16 Claims, 6 Drawing Sheets

APPARATUS AND METHOD FOR COMPENSATING FOR I/Q MISMATCH IN TDD SYSTEM

PRIORITY

This application claims priority under 35 U.S.C. §119 to an application entitled "Apparatus and Method for Compensating for I/Q Mismatch in TDD System" filed in the Korean Intellectual Property Office on Aug. 30, 2005 and allocated Ser. No. 2005-79963, the contents of which are incorporated herein by reference.

BACKGROUND OF THE INVENTION

1. Field of the Invention

The present invention relates generally to an apparatus and a method for compensating for I/Q mismatch in a Time Division Duplex (TDD) system, and more particularly, to an apparatus and a method for compensating for a gain mismatch and a phase mismatch between an I-channel (in-phase) and a Q-channel (quadrature), and a mismatch between channels that is caused by DC offset in a receiver of a TDD Orthogonal Frequency Division Multiplexing (OFDM) system.

2. Description of the Related Art

As the bandwidth of a signal used for a digital communication system is widened, an analog/digital converter (ADC) requires a high sampling frequency in order to convert a received analog signal into a digital signal. However, based on the technical limitations of the sampling frequency of the ADC and the reality of high costs in realizing the technology, an analog receiving terminal discriminates a Q-channel from an I-channel to perform quadrature-down-conversion, and performs the analog/digital conversion.

When the I-channel is discriminated from the Q-channel and quadrature-down-conversion is performed as described above, an ADC that uses a lower sampling frequency can be used in place of an ADC performing analog/digital conversion without discrimination of I/Q-channels. However, in the I/Q-channels that are quadrature-down-converted at the analog receiving terminal and analog-digital-converted in a baseband, the performance of a receiver may be reduced due to differences in a gain, a phase, and a DC offset generated during the quadrature-down-conversion.

"Quadrature receiver mismatch calibration," IEEE Trans. Sig. Proc., Vol. 47, No. 11, pp. 3130-133, November 1999 by R. A. Green, R. Anderson-Sprecher, and P. W. Pierre, and "The Correction Of I And Q Errors In A Coherent Processor," IEEE Trans. Aerosp. Electro. Syst., Vol. AES-17, No. 1, pp. 131-137, January 1981 by F. E. Churchill, G. W. Ogar, and B. J, Thompson have proposed methods for applying a square wave to a receiver, and estimating I/Q mismatch using a received signal converted to a complex baseband.

Also, Korean Patent Application No. 10-2000-0004053 titled "Apparatus For Estimating Channel Considering I/Q Mismatch Error And Digital Signal Receiver Having The Same" and Korean Patent Application No. 10-2002-0026853 titled "Method For Estimating And Compensating For I/Q Mismatch And Apparatus Thereof, And method For Estimating And Compensating For I/Q Mismatch And DC Offset And Apparatus Thereof" have proposed methods for estimating and compensating for I/Q mismatch using a predetermined test signal.

FIG. 1 illustrates a receiver for compensating for I/Q mismatch according to the conventional art. Description will be made using an example where a test signal is generated for estimation of I/Q mismatch.

Referring to FIG. 1, the receiver for compensating for I/Q mismatch includes a test signal generator 101, a band pass filter 103, a low noise amplifier 105, I/Q-channel mixers 107 and 108, a local oscillator 109, a phase shifter 111, low pass filters 113 and 114, ADCs 115 and 116, an I/Q mismatch estimator/compensator 117, and a reception signal detector 119.

In operation, the test signal generator 101 generates predetermined test signals in order to estimate I/Q mismatch of the receiver. The band pass filter 103 filters the test signals generated from the test signal generator 101 to pass only signals in a band used for the receiver. After that, the low noise amplifier 105 low-noise-amplifies the signals that have passed through the band pass filter 103.

The I/Q-channel mixers 107 and 108 perform quadrature-down-conversion on the signals from the low noise amplifier 105 for an I-channel and a Q-channel, respectively, to convert the quadrature-down-converted signals into baseband signals. At this point, the I/Q-channel mixers 107 and 108 receive an oscillation signal from the local oscillator 109 and a signal obtained by phase-shifting, at a phase shifter 111, the oscillation signal from the local oscillator 109 by 90°, respectively, to convert I-channel signals and Q-channel signals into baseband signals.

The low pass filters 113 and 114 filter signals from the I/Q-channel mixers 107 and 108, respectively. After that, the ADCs 115 and 116 convert analog signals into digital signals. The I/Q mismatch estimator/compensator 117 estimates I/Q mismatch of the receiver using the signals received from the ADCs 115 and 116, and compensates for I/Q mismatch of received signals using the estimated I/Q mismatch. At this point, the I/Q mismatch estimator/compensator 117 includes a separate Fast Fourier Transform (FFT) algorithm in order to estimate the I/Q mismatch.

The reception signal detector 119 receives a signal where I/Q mismatch is compensated from the I/Q mismatch estimator/compensator 117 to detect a signal.

As described above, the conventional receiver estimates I/Q mismatch using a test signal. That is, since the conventional receiver estimates I/Q mismatch using a separate test signal, the conventional receiver cannot normally receive a signal while the estimation of the I/Q mismatch is performed. Also, since the conventional receiver additionally requires the signal generator 101 for supplying a test signal to the receiver and a separate algorithm for the estimation of the I/Q mismatch is additionally realized at a demodulation terminal, additional hardware and software resources need to be assigned to realize the receiver.

SUMMARY OF THE INVENTION

An aspect of the present invention is to substantially solve at least the above problems and/or disadvantages and to provide at least the advantages below. Accordingly, an aspect of the present invention is to provide an apparatus and a method for simplifying hardware and software resource assignment for estimation of I/Q mismatch in a TDD system.

Another aspect of the present invention is to provide an apparatus and a method for compensating for I/Q mismatch using a preamble of a transmission signal in a TDD system.

Still another aspect of the present invention is to provide an apparatus and a method for compensating for I/Q mismatch during a normal operation of a TDD system.

Yet another aspect of the present invention is to provide an apparatus and a method for compensating for I/Q mismatch using a preamble of a transmission signal in a TDD OFDM receiver.

According to one aspect of the present invention, an apparatus for compensating for I/Q mismatch using transmission signals in a wireless communication system, the apparatus includes a coupler for coupling the transmission signals to provide the same to a reception path; an FFT operator for performing FFT on a coupled transmission signal; and an I/Q mismatch estimator for estimating I/Q mismatch using a preamble of the FFT-performed transmission signal.

According to another aspect of the present invention, a method for compensating for I/Q mismatch using a transmission signal in a wireless communication system, the method includes coupling the transmission signal; performing FFT on the coupled transmission signal; and calculating gain mismatch, phase mismatch, and a compensation coefficient using a preamble of the FFT-performed transmission signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, technology for compensating for I/Q mismatch by coupling a preamble of a transmission signal in a wireless communication system will be described in detail. Though descriptions will be made using a TDD OFDM wireless communication system for an example, the present invention can be applied to other communication systems based on other multiple access and other division duplexing.

Figure 1:
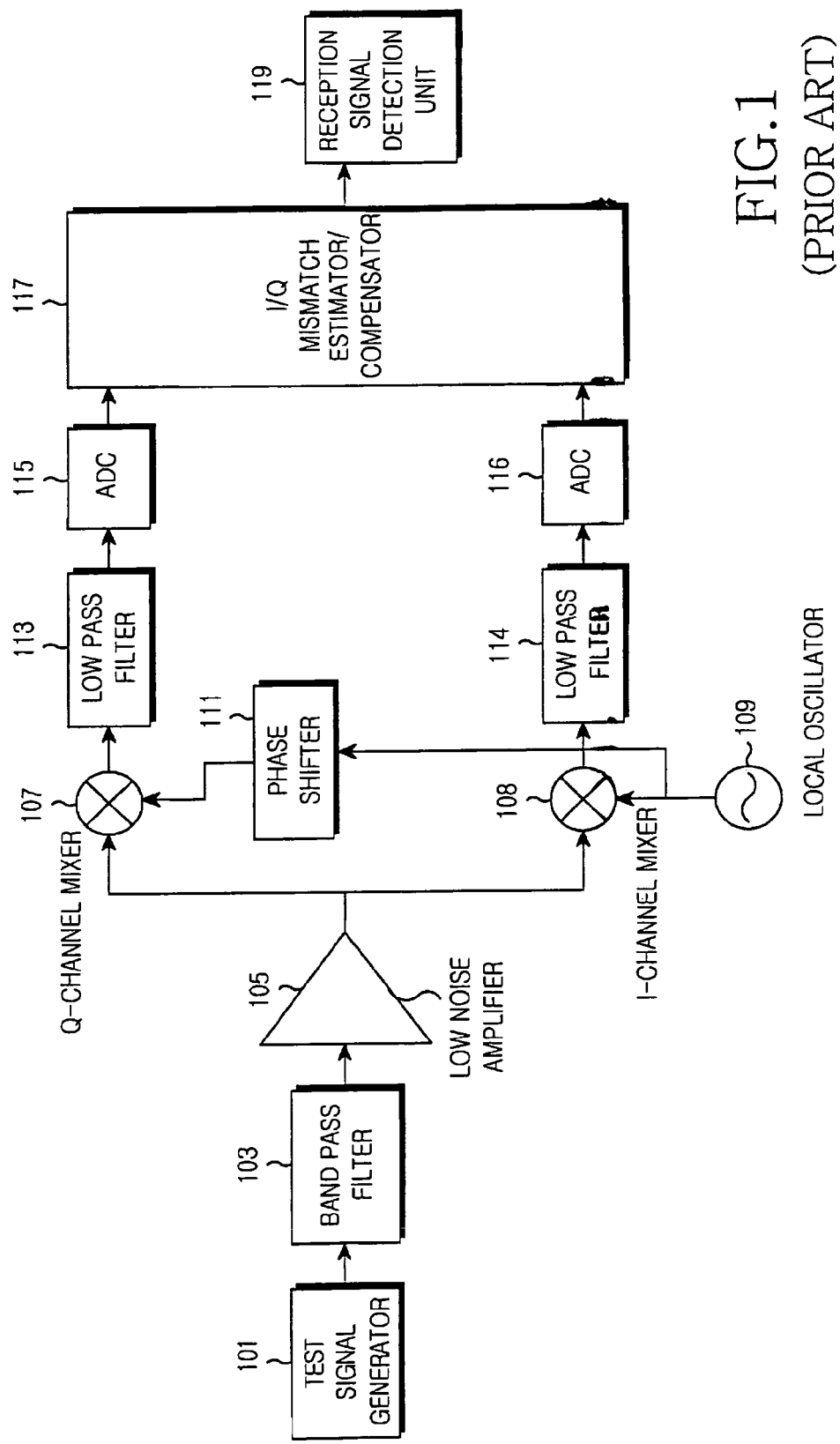
FIG. 1 is a block diagram of a receiver for compensating for I/Q mismatch according to the conventional art.
Figure 2:
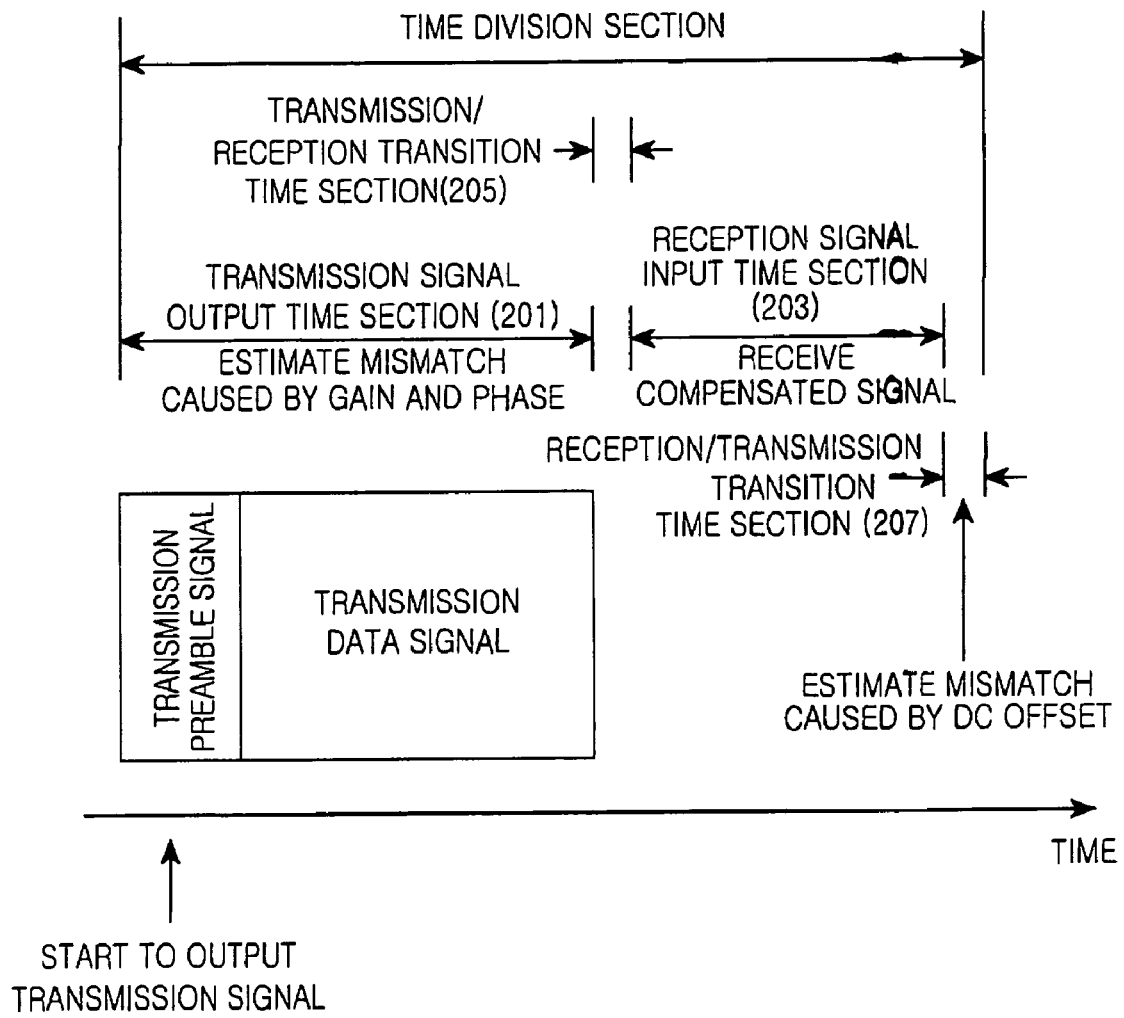
FIG. 2 is a diagram illustrating a time division section of a general TDD system.

FIG. 2 is a diagram illustrating a time division section of a general TDD system.

Referring to FIG. 2, the TDD system does not need to perform a reception signal detection operation during a transmission time section 201 during which a transmission signal is output because there is no reception signal input to the receiver during the transmission time section 201. Also, there exist guard time sections 205 and 207 between the transmission time section 201 and a reception time section 203. During the transmission time section 201, a preamble and a data signal are sequentially output as illustrated in FIG. 2.

Therefore, the present invention is designed to estimate the I/Q mismatch using a characteristic of the time division section of the TDD system that does not perform a reception signal detection operation during the transmission time section 201. Since a reception block does not operate during the transmission time section 201, a transmission signal output during the transmission time section 201 is coupled to the reception block. The reception block uses a preamble of the coupled transmission signal instead of a test signal that has been used for the estimation of the I/Q mismatch to estimate the I/Q mismatch. After that, during the reception time section 203, the estimated I/Q mismatch is applied to a received signal to compensate for the I/Q mismatch.

Figure 3:
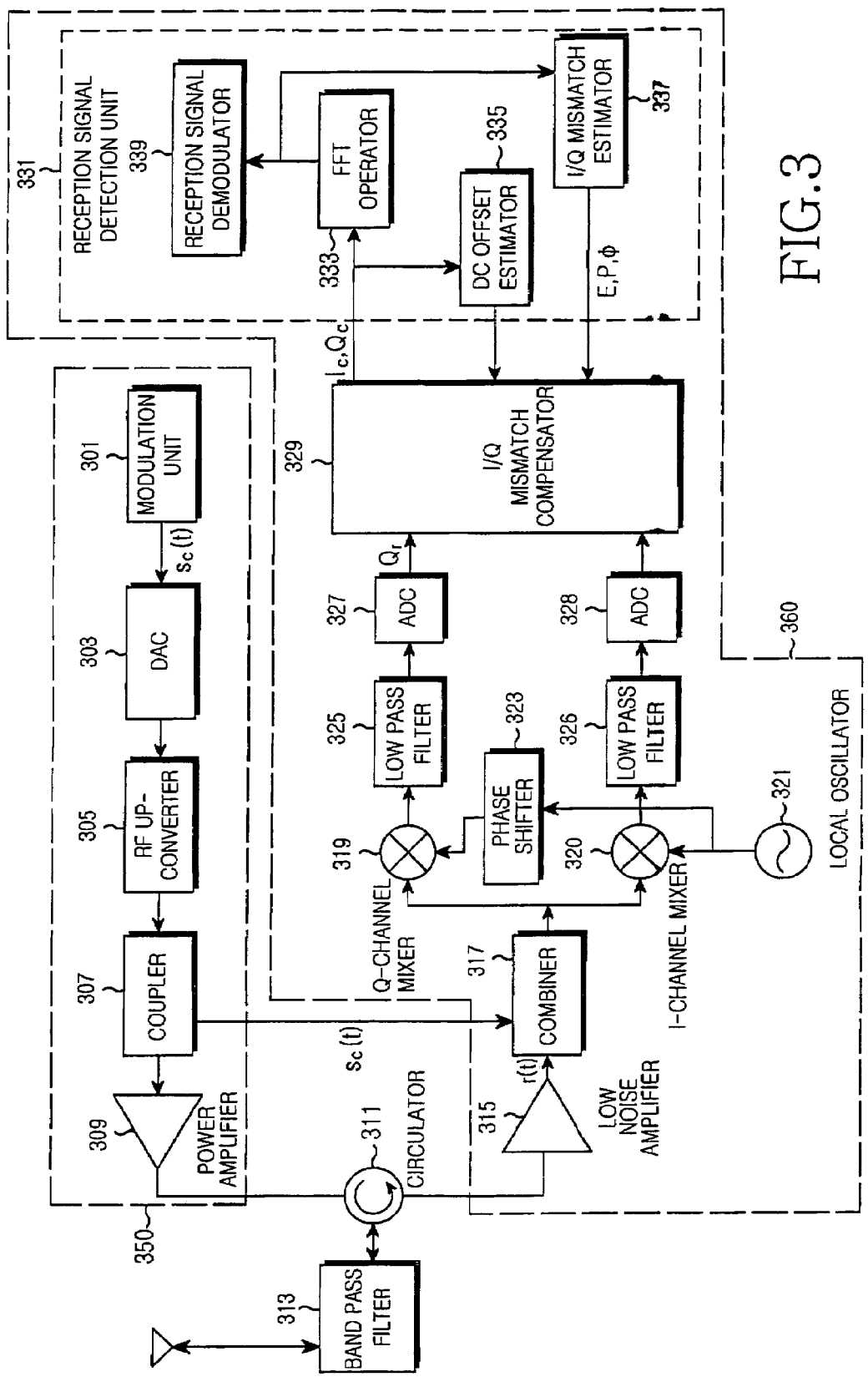
FIG. 3 is a block diagram of a receiver for compensating for I/Q mismatch according to the present invention.

FIG. 3 is a block diagram of a receiver for compensating for I/Q mismatch according to the present invention.

Referring to FIG. 3, the receiver of a TDD system includes a transmission block 350, a reception block 360, a circulator (also known as a radio frequency (RF) switch) 311, and a band pass filter 313.

The transmission block 350 includes a modulation unit 301, a digital/analog converter (DAC) 303, an RF-up converter 305, a coupler 307, and a power amplifier 309.

During the transmission time section 201 in FIG. 2, the modulation unit 301 modulates a transmission signal using a predetermined modulation method and a predetermined coding rate and outputs the modulated signal. The DAC 303 receives a digital output signal $S_o(t)$ from the modulation unit 301 and converts the received digital output signal $S_o(t)$ to an analog signal. The RF-up converter 305 converts a baseband signal received from the DAC 303 into an RF signal.

The coupler 307 couples a signal from the RF-up converter 305 and provides the coupled signal to the reception block. At this point, the coupler 307 controls a coupling size of a coupled signal $S_c(t)$ to be transmitted such that the coupled signal $S_c(t)$ is of a size that allows the reception block to operate. Though the providing of the coupled signal to the reception block has been described using a coupler for an example, a divider can perform the same function.

Since a transmission signal that has passed through the coupler 307 has low power and thus cannot be directly transmitted, the transmission signal is amplified by the power amplifier 309 to have high power and passes through the RF switch 311 and transmitted via an antenna. The RF switch 311 is interposed between the transmission block and the reception block to prevent a amplified transmission signal from being provided to the reception block during a transmission mode. In the present invention, the RF switch 311 is realized using a circulator.

Next, the reception block 360 includes a low noise amplifier 315, a combiner 317, I/Q-channel mixers 319 and 320, a local oscillator 321, a phase shifter (also know as a phase converter) 323, low pass filters 325 and 326, ADCs 327 and 328, an I/Q mismatch compensator 329, and a reception signal detection unit 331. The reception block 360 estimates I/Q mismatch using a coupled signal provided from the transmission block 350 during the transmission time section 201.

During the transmission time section 201, the combiner 317 provides a coupled signal $S_c(t)$ by the coupler 307 to a reception path. The I/Q-channel mixers 319 and 320 receive signals of an I-channel and signals of a Q-channel, respectively, and perform quadrature-down-conversion on the received signals to convert the received signals to baseband signals. The I/Q-channel mixers 319 and 320 receive an oscillation signal from the local oscillator 321 and a signal obtained by phase-shifting, at a phase-shifter 323, the oscillation signal by 90°, respectively, to convert I-channel signals and Q-channel signals into baseband signals.

The low pass filters 325 and 326 filter signals from the I/Q-channel mixers 319 and 320, respectively. TDCs 115 and 116 convert analog signals into digital signals. Signals output from the ADCs 327 and 328 include distortion generated in the I/Q channels, respectively. The distortion is expressed as shown in Equation (1):

$$I_r(t)=(1+e)\times[r(t)\times\cos(w_ct+\theta)]_{LPF}+a$$

$$Q_r(t)=[r(t)\times\sin(w_ct+\theta+\phi)]_{LPF}+b \quad (1)$$

where r(t) is a signal input to the I/Q-channel mixers 319 and 320, "e" is gain mismatch, φ is phase mismatch, "a" is DC offset of an I-channel, "b" is DC offset of a Q-channel, $W_c(=2\pi f_c)$ is an operation frequency of the local oscillator 321, $W_c$ is equal to an operation frequency of a transceiver, θ is a phase of the oscillator 321, and $[\ ]_{LPF}$ is a result obtained after passing the signal through the low pass filters 325 and 326.

During the reception time section 203, the I/Q mismatch compensator 329 compensates for a reception signal distorted by I/Q mismatch and provided from the ADCs 327 and 328 using Equation (2) with a DC offset estimation value provided from the reception signal detection unit 331 and an I/Q mismatch estimation value. Here, the I/Q mismatch compensator 329 compensates for a reception signal received during the reception time section 203 using a DC offset and I/Q mismatch estimated using a preamble of a transmission signal coupled during the transmission time section 201.

Equation (2) is for compensating for I/Q mismatch.

$$\begin{bmatrix} I_c \\ Q_c \end{bmatrix} = \begin{bmatrix} E & 0 \\ P & 1 \end{bmatrix} \cdot \begin{bmatrix} I_{rd} \\ Q_{rd} \end{bmatrix} \quad (2)$$

where $I_{rd}$ and $Q_{rd}$ are DC offset-compensated signals. Also, $$E = \frac{\cos\varphi}{1+e}+1$$

and $$P = \frac{\sin\varphi}{1+e}$$

are compensation coefficients estimated by the I/Q mismatch estimator 337 of the reception signal detection unit 331.

The reception signal detection unit 331 includes an FFT operator 333, a DC offset estimator 335, an I/Q mismatch estimator 337, and a reception signal demodulator 339. The reception signal detection unit 331 estimates I/Q mismatch and a DC offset using a coupled signal during the transmission time section 201.

The FFT operator 333 and the DC offset estimator 335 receive a signal $r_r(t)$ from the I/Q mismatch compensator 329. First, the DC offset estimator 335 estimates a DC offset using a coupled signal during the transmission time section 201. That is, the DC offset estimator 335 measures a size of noise power of each channel during a reception/transmission transition time section 207 of FIG. 2 to estimate a DC offset using Equation (3). After that, the DC offset estimator 335 provides the estimated DC offset to the I/Q mismatch compensator 329 to compensate for a DC offset of a signal received during the reception time section 203 using Equation (4).

Equation (3) is for estimating a DC offset.

$$a = \frac{1}{N}\sum_n I_r(n) \quad (3)$$

-continued $$b = \frac{1}{N}\sum_n Q_r(n)$$

where N is the number of samples of signals measured during the reception/transmission time section 207.

Equation (4) represents DC offset-compensated I/Q-channels.

$$I_{rd}(t)=(1+e)\times[r(t)\times\cos(w_ct+\theta)]_{LPF}$$

$$Q_{rd}(t)=[r(t)\times\sin(w_ct+\theta+\phi)]_{LPF} \quad (4)$$

where r(t) is a signal input to the I/Q-channel mixers 319 and 320, "e" is gain mismatch, φ is phase mismatch, $W_c(=2\pi f_c)$ is an operation frequency of the local oscillator 321, $W_c$ is equal to an operation frequency of a transceiver, θ is a phase of the oscillator 321, and $[\ ]_{LPF}$ is a result obtained after passing the signal through the low pass filters 325 and 326.

The FFT operator 333 performs Fourier Transform on $r_r(t)$, i.e., a transmission signal distorted by the I/Q mismatch to output the Fourier-transformed signal to the I/Q mismatch estimator 337 and the reception signal demodulator 339. Here, Equation (5) expresses a Fourier-transformed signal $r_r(t)$.

Equation (5) is a result obtained by performing Fourier transform on a signal distorted by the I/Q mismatch.

$$R_r(kB) = \frac{1}{M}\sum_{m=0}^{M-1} r_r(mT)\exp(-j2\pi km/M) \quad (5)$$

where M is the number of Fourier transform samples, (1/T) is a sampling frequency, k=0, 1, 2, . . . , M−1, and B (=1/(MT)) is an interval of the subcarriers.

The I/Q mismatch estimator 337 estimates compensation coefficients E and P, and a phase mismatch φ using a preamble of transmission signals Fourier-transformed and provided from the FFT operator 333.

A method for estimating, at the reception signal detection unit 331, compensation coefficients and a phase mismatch will be described in detail.

First, a preamble of the transmission signal Sc(t) is expressed as Equation (6):

$$S_{cp}(t) = \left\{\frac{1}{H}\sum_{h=0}^{H-1} C_h \cdot \exp(j2\pi ht/(HT))\right\} \cdot \exp(j2\pi f_c t) \quad (6)$$

where $f_c$ is a transmission/reception frequency, (1/T) is a sampling frequency, $C_h$ is a coefficient of a subcarrier, and h=0, 1, 2, . . . , H−1, which are H subcarriers.

When the preamble signal is distorted due to the I/Q mismatch during quadrature-down-conversion, the preamble signal is expressed as Equation (7):

$$r_r(t) = \frac{1+e}{2H}\left\{\sum_{h=0}^{H-1} c_h\cos(2\pi ht/(HT))\right\}\cos\theta + \quad (7)$$

-continued $$a + j\left[\left\{\frac{1}{2H}\sum_{h=0}^{H-1}c_h\sin(2\pi ht/(HT))\right\}\sin(\varphi+\theta)+b\right]$$

where "e" is gain mismatch, $\phi$ is phase mismatch, $\theta$ is a phase of the oscillator 321, $C_h$ is a coefficient of a subcarrier, "a" is a DC offset of an I-channel, "b" is a DC offset of a Q-channel, and H is the number of subcarriers h.

Fourier transform is performed on the signal expressed in Equation (7) in order to estimate the I/Q mismatch. That is, when Equation (7) is input to Equation (5), Equation (8) is obtained.

Equation (8) is obtained by performing Fourier transform on the signal distorted by I/Q mismatch.

$$R_r(kB) = \frac{C_k}{2}(1+e-\cos\varphi+j\sin\varphi)\exp(j\theta) \quad (8)$$

$$R_r((K-k)B) = \frac{C_{K-k}}{2}(1+e-\cos\varphi+j\sin\varphi)\exp(-j\theta)$$

where $R_r(kB)$ is a subcarrier of a Fourier-transformed preamble, $R_r((K-k)B)$ is an image signal of the subcarrier, $C_k$ is a coefficient of the subcarrier, "e" is gain mismatch, $\phi$ is phase mismatch, $\theta$ is a phase of the oscillator 321, and K is a length of Fourier transform.

After that, a phase mismatch $\phi$, compensation coefficients E and P, and gain mismatch "e" are calculated by inputting a subcarrier of a preamble and an image signal expressed as Equation (8) into Equation (9).

Equation (9) is for calculating compensation coefficients.

$$E = \frac{\cos\varphi}{1+e}+1 \quad (9)$$

$$P = \frac{\sin\varphi}{1+e}$$

where $\phi$ is phase mismatch and "e" is gain mismatch.

When the subcarrier of the preamble and the image signal of the subcarrier are input to Equation (9), compensation coefficients E(k) and P(k) are calculated as Equation (10):

$$E(k) = -2\text{Re}\left\{\frac{R_r((K-k)B)/c_{K-k}}{R_r^*(kB)/c_k + R_r((K-k)B)/c_{K-k}}\right\}+1 \quad (10)$$

$$P(k) = -2\text{Im}\left\{\frac{R_r((K-K)B)/c_{K-k}}{R_r^*(kB)/c_k + R_r((K-k)B)/c_{K-k}}\right\}$$

where $R^*_r(k)$ is a complex conjugate of $R_r(k)$, $R_r(kB)$ is a subcarrier of a Fourier-transformed preamble, $R_r((K-k)B)$ is an image signal of the subcarrier, B is an interval (1/MT) between subcarriers, M is the number of Fourier-transformed samples, and (1/T) is a sampling frequency. Because subcarriers used by the preamble signal can be located at an image frequency position therebetween, the subcarriers and the image signal are used.

That is, $k^{th}$ compensation coefficients E(k) and P(k) are calculated using a $k^{th}$ subcarrier and an image signal of the subcarrier, and the carrier and a subcarrier coefficient of the image signal.

When the compensation coefficients and the phase mismatch are all calculated, the I/Q mismatch estimator 337 provides the calculated correction coefficients and phase mismatch to the I/Q mismatch compensator 329, which compensates for distortion of a signal received during the reception time section 203 using the compensation coefficients and the phase mismatch provided from the I/Q mismatch estimator 337.

When a root mean square (RMS) value of the compensation coefficients calculated using Equation (10) is applied to Equation (2), distortion compensation of the received signal compensates for the I/Q mismatch as expressed in Equation (11):

$$I_c(t) = \cos\phi\times[r(t)\times\cos(w_ct+\theta)]_{LPF}$$

$$Q_c(t) = \cos\phi\times[r(t)\times\sin(w_ct+\theta)]_{LPF} \quad (11)$$

where $\phi$ is phase mismatch, $\theta$ is a phase of the oscillator 321, and $[\ ]_{LPF}$ is a result obtained after passing the signal through the low pass filters 325 and 326.

When the calculated phase mismatch $\phi$ is input to Equation (11) with the I/Q mismatch compensated for as Equation (11), a final compensation is performed as Equation (12):

$$I_o(t) = [r(t)\times\cos(w_ct+\theta)]_{LPF}$$

$$Q_o(t) = [r(t)\times\sin(w_ct+\theta)]_{LPF} \quad (12)$$

The reception signal demodulator 339 receives an I/Q mismatch-compensated reception signal from the FFT operator 333 to demodulate the reception signal.

Figure 4:
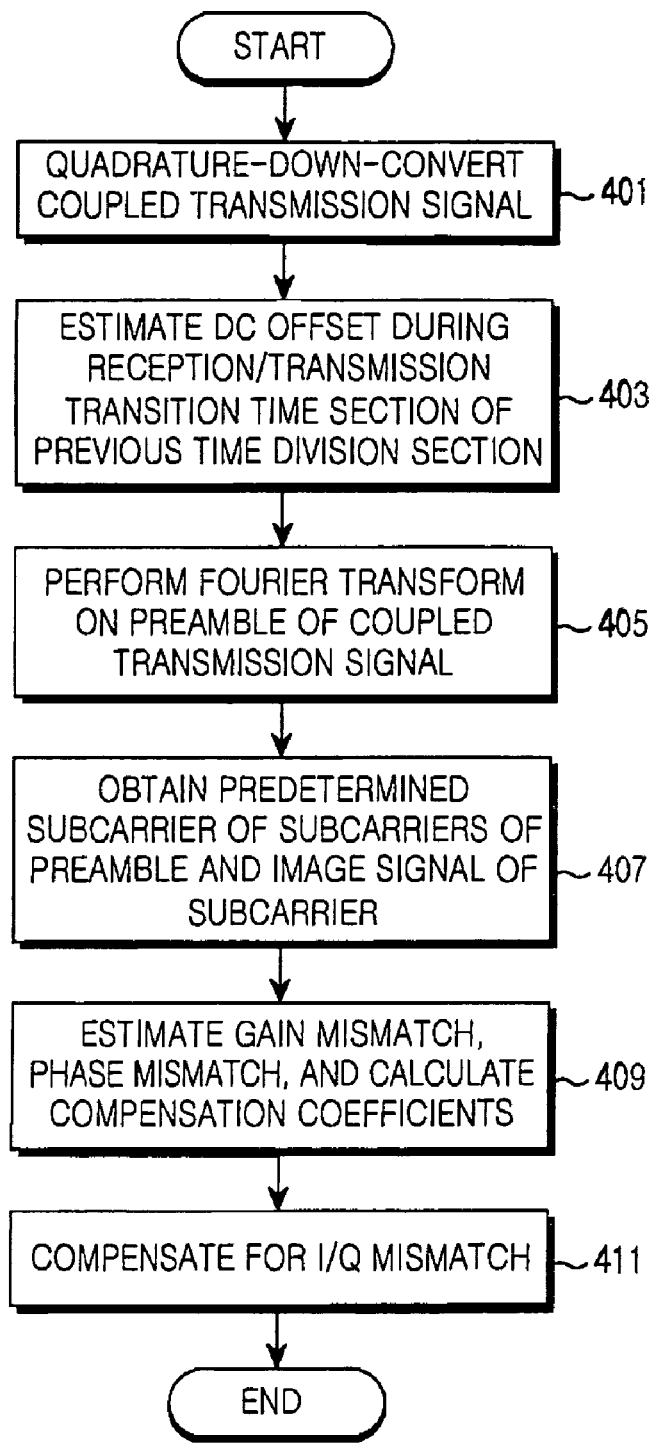
FIG. 4 is a flowchart illustrating a process for compensating for I/Q mismatch according to the present invention.

FIG. 4 is a flowchart illustrating a process for compensating for I/Q mismatch according to the present invention.

Referring to FIG. 4, in step 401, a receiver quadrature-down-converts a coupled transmission signal provided from the coupler during the transmission time section into a baseband signal. When the transmission signal is quadrature-down-converted, a distortion is generated due to the I/Q mismatch as expressed as Equation (1).

After the coupled transmission signal is converted into the baseband signal, the receiver performs step 403 to estimate a DC offset using the baseband signal. That is, referring to FIG. 2, the receiver estimates a DC offset of an I-channel and a Q-channel using Equation (3) during the reception/transmission transition time section 207 of a previous time division section.

The receiver performs step 405 to perform Fourier transform on the coupled transmission signal. When the preamble is Fourier-transformed, a subcarrier and an image signal of the subcarrier expressed as Equation (8) are obtained.

After the subcarrier of the preamble and the image signal of the subcarrier are obtained, the receiver performs step 409 to apply the subcarrier of the preamble and the image signal to Equation (9) and calculate the compensation coefficients E and P, the phase mismatch $\phi$, and the gain mismatch "e". Because subcarriers used by the preamble signal can be located at an image frequency position therebetween, the subcarriers and the image signal are used.

After estimating the compensation coefficients, the phase mismatch, and the gain mismatch, the receiver performs step 411 to compensate for the I/Q mismatch of a signal received during the reception time section 203 using the estimated compensation coefficients and the phase mismatch. After the compensation coefficients are applied to Equation (2) for compensation of the reception signal so that the gain mismatch is compensated for as in Equation (11), the estimated phase mismatch is input to finally compensate for the I/Q mismatch. After that, the receiver ends the present algorithm.

Figure 5:
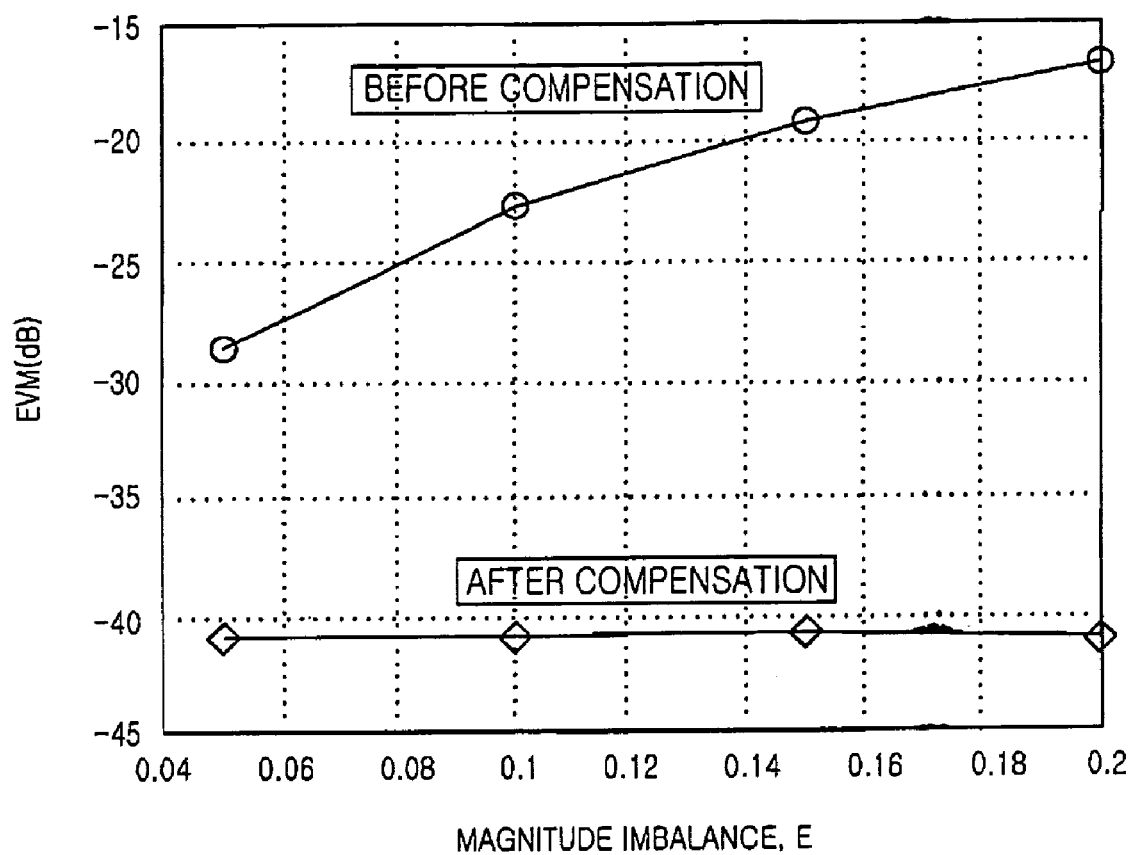
FIG. 5 is a graph illustrating performance versus gain mismatch according to the present invention.
Figure 6:
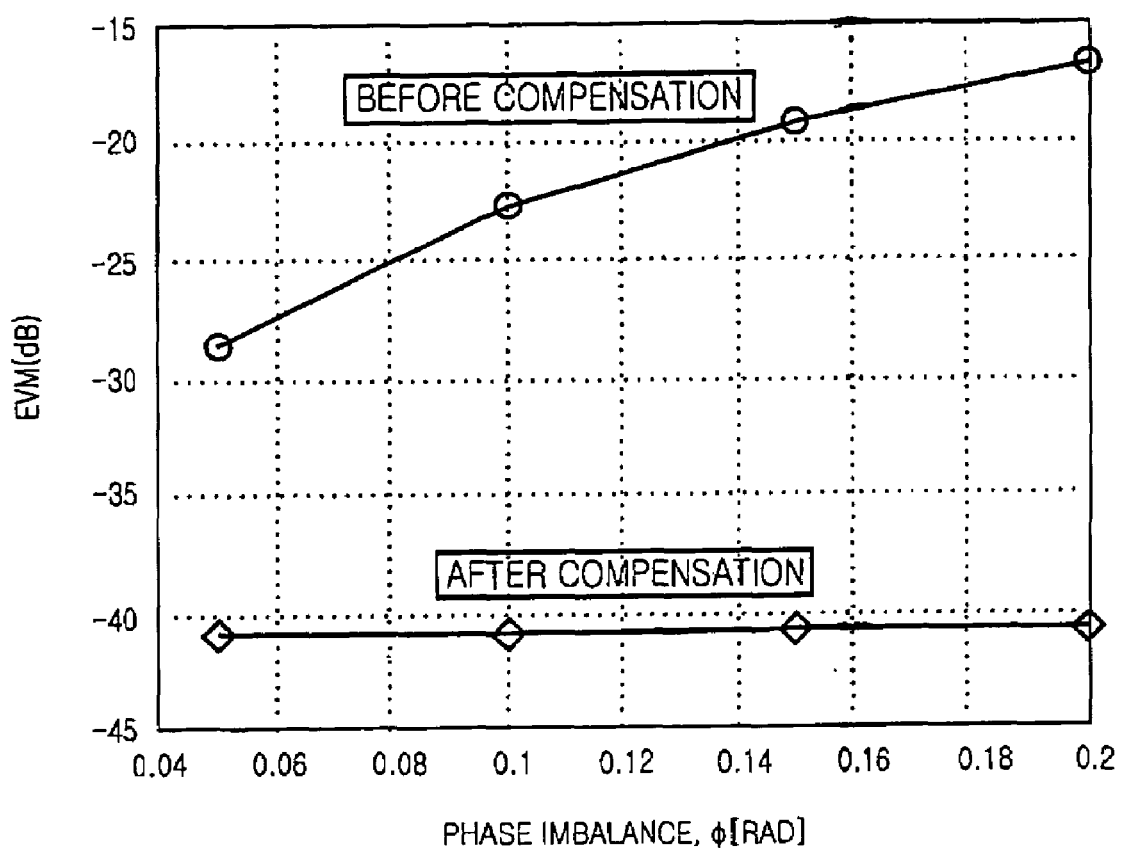
FIG. 6 is a graph illustrating performance versus phase mismatch according to the present invention.

FIGS. 5 and 6 illustrate error vector magnitude (EVM) values when the gain mismatch and the phase mismatch are generated according to the present invention.

A description will be made of the experiments performed under an Additive White Gaussian Noise (AWGN) environment in which quadrature phase shift keying modulation is used, OFDM symbols having 2048 Fourier transform lengths use 1703 subcarriers, and signal-to-noise ratio (SNR) is 40 dB. Also, the horizontal axis and the vertical axis of FIG. 5 are the gain mismatch and the EVM, respectively. The horizontal axis and the vertical axis of FIG. 6 are the phase mismatch and the EVM, respectively.

Referring to FIGS. 5 and 6, before the I/Q mismatch is compensated for, the EVM increases in proportion to the gain mismatch and the phase mismatch. However, when the I/Q mismatch is compensated for in real-time according to the present invention, the EVM is maintained constant even though the gain mismatch and the phase mismatch increase.

As described above, the I/Q mismatch can be compensated for in real-time in a TDD OFDM receiver by coupling, at a separate test signal generator, a transmission signal without the use of a separate test signal generator and estimating and compensating for the I/Q mismatch. Also, since an FFT operator realized in a reception signal detection unit of a TDD OFDM receiver is used without the need for a separate algorithm for the Fourier transform required during an I/Q mismatch estimation process, resources can be saved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for compensating for an I (in-phase)/Q (quadrature-phase) mismatch in a wireless communication system, the apparatus comprising:
    a detector for detecting transmission signals and providing the transmission signals to a reception path;
    a Fast Fourier transform (FFT) operator for performing FFT on a detected transmission signal; and
    an I/Q mismatch estimator for estimating the I/Q mismatch using a preamble of the transmission signal after the FFT,
    wherein the detector detects the transmission signals in transmission time sections during which no signals are received, and
    wherein the detected transmission signal includes the preamble,
    wherein the I/O mismatch estimator calculates compensation coefficients, a phase mismatch, and a gain mismatch using subcarriers of the Fourier-transformed preamble, and an image signal of the subcarriers, and
    wherein the subcarriers of the Fourier-transformed preamble and the image signal of the subcarriers are calculated by:

$$R_R(kB) = \frac{C_k}{2}(1 + e - \cos\varphi + j\sin\varphi)\exp(j\theta)$$

$$R_r((K-K)B) = \frac{C_{K-k}}{2}(1 + e - \cos\varphi + j\sin\varphi)\exp(-j\theta)$$

where $R_r(kB)$ is a subcarrier of a Fourier-transformed preamble $R_r((K-k)B)$ is an image signal of the subcarrier, $C_k$ is a coefficient of the subcarrier, "e" is gain mismatch, $\varphi$ is phase mismatch, $\theta$ is a phase of the oscillator 321, and K is a length th of Fourier transform.

2. The apparatus of claim 1, wherein the detector comprises one of a coupler and a divider.

3. The apparatus of claim 1, further comprising:
    a baseband converter for separating coupled transmission signals for each of the I-channel and the Q-channel, quadrature-down-converting a received signal into a baseband signal, and providing the baseband signal to the FFT operator; and
    a DC offset estimator for receiving the baseband signal and estimating a DC offset using the baseband signal.

4. The apparatus of claim 3, wherein the baseband converter comprises:
    a combiner for providing the coupled transmission signal to the reception path;
    first and second mixers for separating the coupled transmission signals for each of the I-channel and the Q-channel and quadrature-down-converting the separated transmission signals; and
    analog/digital converters (ADCs) for converting the quadrature-down-converted analog signals into digital signals.

5. The apparatus of claim 1, wherein the compensation coefficients are calculated by $$E(k) = -2\text{Re}\left\{\frac{R_r((K-k)B)/c_{K-k}}{R_r^*(kB)/c_k + R_r((K-k)B)/c_{K-k}}\right\} + 1$$

$$P(k) = -2\text{Im}\left\{\frac{R_r((K-k)B)/c_{K-k}}{R_r^*(kB)/c_k + R_r((K-k)B)/c_{K-k}}\right\}$$

where E(k) and P(k) are compensation coefficients, $R^*_r(k)$ is a complex conjugate of $R_r(k)$, $R_r(kB)$ is a subcarrier of a Fourier-transformed preamble, $R_r((K-k)B)$ is an image signal of the subcarrier, B is an interval (1/MT) between subcarriers, M is the number of Fourier-transformed samples, and (1/T) is a sampling frequency.

6. The apparatus of claim 5, wherein the compensation coefficients are calculated using a root mean square (RMS) of the compensation coefficients calculated using the subcarriers.

7. The apparatus of claim 1, further comprising an I/Q mismatch compensator for compensating for the I/Q mismatch of a reception signal using the estimated I/Q mismatch.

8. The apparatus of claim 7, wherein the compensation by the I/Q mismatch compensator is calculated by:

$$\begin{bmatrix} I_c \\ Q_c \end{bmatrix} = \begin{bmatrix} E & 0 \\ P & 1 \end{bmatrix} \cdot \begin{bmatrix} I_{rd} \\ Q_{rd} \end{bmatrix}$$

where $I_{rd}$ and $Q_{rd}$ are DC offset-compensated I-channel and Q-channel signals, and E and P are compensation coefficients.

9. A method for compensating for an I(in-phase)/Q (quadrature phase) mismatch in a wireless communication system, comprising the steps of:
    coupling transmission signals during a transmission time section in which no signal is received;
    performing Fast Fourier Transform (FFT) on the coupled transmission signals; and
    calculating a gain mismatch, a phase mismatch, and compensation coefficients using a preamble of the transmission signal after the FFT, wherein the coupled transmission signals include the preamble, and wherein the calculating step comprises:

obtaining subcarriers of the preamble of the transmission signals after the FFT and image signals of the subcarriers; and calculating the gain mismatch, the phase mismatch, and the compensation coefficients using the obtained subcarriers and image signals, and wherein the subcarriers of the preamble of the transmission signal after the FFT and image signals of the subcarriers are calculated by:

$$R_r(kB) = \frac{C_k}{2}(1 + e - \cos\varphi + j\sin\varphi)\exp(j\theta)$$

$$R_r((K-k)B) = \frac{C_{K-k}}{2}(1 + e - \cos\varphi + j\sin\varphi)\exp(-j\theta)$$

where $R_r(kB)$ is a subcarrier of a Fourier-transformed preamble, $R_r((K-k)B)$ is an image signal of the subcarrier, $C_k$ is a coefficient of the subcarrier, "e" is gain mismatch, $\varphi$ is phase mismatch, $\theta$ is a phase of the oscillator 321, and K is a length of Fourier transform.

10. The method of claim 9, further comprising:

separating the coupled transmission signals for each of an I-channel and a Q-channel to quadrature-down-convert the separated signals to baseband signals; and estimating a DC offset during a reception/transmission transition time section of a previous time division section using the baseband signals.

11. The method of claim 9, wherein the compensation coefficients are calculated by $$E(k) = -2\text{Re}\left\{\frac{R_r((K-k)B)/c_{K-k}}{R_r^*(kB)/c_k + R_r((K-k)B)/c_{K-k}}\right\} + 1$$

$$P(k) = -2\text{Im}\left\{\frac{R_r((K-k)B)/c_{K-k}}{R_r^*(kB)/c_k + R_r((K-k)B)/c_{K-k}}\right\}$$

where E(k) and P(k) are compensation coefficients, $R^*_r(k)$ is a complex conjugate of $R_r(k)$, $R_r(kB)$ is a subcarrier of a Fourier-transformed preamble, and $R_r((K-k)B)$ is an image signal of the subcarrier.

12. The method of claim 9, wherein the compensation coefficients are calculated using a root mean square (RMS) of the compensation coefficients calculated using the subcarriers.

13. The method of claim 9, further comprising compensating for the I/Q mismatch of a reception signal using the estimated I/Q mismatch.

14. The method of claim 13, wherein the compensation by the I/Q mismatch compensator is calculated by $$\begin{bmatrix} I_c \\ Q_c \end{bmatrix} = \begin{bmatrix} E & 0 \\ P & 1 \end{bmatrix} \cdot \begin{bmatrix} I_{rd} \\ Q_{rd} \end{bmatrix}$$

where $I_{rd}$ and $Q_{rd}$ are DC offset-compensated I-channel and Q-channel signals, and E and P are compensation coefficients.

15. An apparatus for compensating a phase mismatch in a wireless communication system, the apparatus comprising:

a detector for detecting transmission signals and providing the detected transmission signal signals to a reception path;

a Fast Fourier transform (FFT) operator for performing FFT on detected transmission signals; and an I (in-phase)/Q (Quadrature-phase) mismatch estimator for estimating the I/Q mismatch using a preamble of the FFT transmission signals, wherein the detector detects the transmission signals in transmission time sections during which no signals are received, and wherein the detected transmission signal includes the preamble, wherein the I/O mismatch estimator calculates compensation coefficients, a phase mismatch, and a gain mismatch using subcarriers of the Fourier-transformed preamble, and an image signal of the subcarriers, and wherein the subcarriers of the Fourier-transformed preamble, and the image signal of the subcarriers are calculated by:

$$R_r(kB) = \frac{C_k}{2}(1 + e - \cos\varphi + j\sin\varphi)\exp(j\theta)$$

$$R_r((K-k)B) = \frac{C_{K-k}}{2}(1 + e - \cos\varphi + j\sin\varphi)\exp(-j\theta),$$

where $R_r(kB)$ is a subcarrier of a Fourier-transformed preamble, $R_r((K-k)B)$ is an image signal of the subcarrier, $C_k$ is a coefficient of the subcarrier, "e" is gain mismatch, $\varphi$ is phase mismatch, $\theta$ is a phase of the oscillator 321, and K is a length of Fourier transform.

16. A method for compensating for a phase mismatch in a wireless communication system, comprising the steps of:

detecting transmission signals in transmission time sections during which no signals are received;

performing Fast Fourier Transform (FFT) on the detected transmission signals; and calculating a gain mismatch, a phase mismatch, and compensation coefficients using a preamble of the FFT transmission signals, wherein the detected transmission signals include the preamble, wherein the calculating step comprises:

obtaining subcarriers of the preamble of the transmission signals after the FFT and image signals of the subcarriers; and calculating the gain mismatch, the phase mismatch, and the compensation coefficients using the obtained subcarriers and image signals, wherein the subcarriers of the preamble of the transmission signal after the FFT and the image signals of the subcarriers are calculated by:

$$R_r(kB) = \frac{C_k}{2}(1 + e - \cos\varphi + j\sin\varphi)\exp(j\theta)$$

$$R_r((K-k)B) = \frac{C_{K-k}}{2}(1 + e - \cos\varphi + j\sin\varphi)\exp(-j\theta),$$

where $R_r(kB)$ is a subcarrier of a Fourier-transformed preamble, $R_r((K-k)B)$ is an image signal of the subcarrier, $C_k$ is a coefficient of the subcarrier, "e" is gain mismatch, $\varphi$ is phase mismatch, $\theta$ is a phase of the oscillator 321, and K is a length of Fourier transform.

* * * * *